US008738585B2

(12) United States Patent
Abraham et al.

(10) Patent No.: US 8,738,585 B2
(45) Date of Patent: May 27, 2014

(54) RESTORE SOFTWARE WITH AGGREGATED VIEW OF SITE COLLECTIONS

(75) Inventors: Lijo J. Abraham, Lake Mary, FL (US); Ynn-Pyng Tsaur, Oviedo, FL (US); Baishen Zhu, Sanford, FL (US); Lee M. Doucette, Deltona, FL (US); Deepak Saraf, Windermere, FL (US); Steven R. Devos, Mercer Island, WA (US)

(73) Assignee: Symantec Corporation, Mountain View, CA (US)

( * ) Notice: Subject to any disclaimer, the term of this patent is extended or adjusted under 35 U.S.C. 154(b) by 69 days.

(21) Appl. No.: 13/549,054

(22) Filed: Jul. 13, 2012

(65) Prior Publication Data
US 2014/0019414 A1 Jan. 16, 2014

(51) Int. Cl.
*G06F 17/30* (2006.01)
*G06F 11/14* (2006.01)

(52) U.S. Cl.
CPC .... *G06F 17/30067* (2013.01); *G06F 17/30073* (2013.01); *G06F 17/30076* (2013.01); *G06F 11/1448* (2013.01)
USPC ........... 707/679; 707/640; 707/650; 707/674; 707/680; 707/681; 709/201; 709/203; 709/213; 709/217; 715/700; 717/100; 717/159

(58) Field of Classification Search
CPC ..................... G06F 17/30067; G06F 17/30073; G06F 17/30076; G06F 11/1148
USPC ................. 707/679, 674, 680, 681, 640, 650; 715/700; 717/100, 159
See application file for complete search history.

(56) References Cited

U.S. PATENT DOCUMENTS

| 5,278,970 | A | 1/1994 | Pence | |
|---|---|---|---|---|
| 5,475,834 | A | 12/1995 | Anglin et al. | |
| 5,822,780 | A | 10/1998 | Schutzman | |
| 6,330,572 | B1 | 12/2001 | Sitka | |
| 6,421,733 | B1 * | 7/2002 | Tso et al. | 709/246 |
| 6,427,175 | B1 * | 7/2002 | Khan et al. | 709/245 |
| 6,804,719 | B1 | 10/2004 | Cabrera et al. | |
| 6,947,959 | B1 | 9/2005 | Gill | |
| 6,952,724 | B2 * | 10/2005 | Prust | 709/219 |
| 6,961,811 | B2 | 11/2005 | Dawson et al. | |
| 7,340,675 | B1 * | 3/2008 | Hancock | 715/234 |
| 7,467,349 | B1 * | 12/2008 | Bryar et al. | 715/205 |
| 7,870,272 | B2 * | 1/2011 | Berkowitz et al. | 709/229 |
| 8,046,438 | B2 * | 10/2011 | Martinez et al. | 709/219 |
| 8,176,411 | B2 * | 5/2012 | Palmieri | 715/205 |
| 2003/0225801 | A1 | 12/2003 | Devarakonda et al. | |
| 2004/0039891 | A1 | 2/2004 | Leung et al. | |
| 2004/0049513 | A1 | 3/2004 | Yakir et al. | |

(Continued)

*Primary Examiner* — Frantz Coby
(74) *Attorney, Agent, or Firm* — Rory D. Rankin; Meyertons, Hood, Kivlin, Kowert & Goetzel, P.C.

(57) ABSTRACT

A system and method for restoring site collections stored in different content databases of a web application are disclosed. A restoration GUI may be displayed. Displaying the restoration GUI may include determining a plurality of databases used for the web application. For each respective database of the plurality of databases, one or more site collections stored in the database may be determined. Displaying the graphical user interface may further comprise displaying an aggregated view of the site collections stored in each database of the plurality of databases. The aggregated view may enable each site collection to be selected for restoration.

18 Claims, 19 Drawing Sheets

(56) References Cited

U.S. PATENT DOCUMENTS

| | | |
|---|---|---|
| 2004/0054656 A1 | 3/2004 | Leung et al. |
| 2005/0033757 A1 | 2/2005 | Greenblatt et al. |
| 2005/0071560 A1 | 3/2005 | Bolik |
| 2005/0203964 A1 | 9/2005 | Matsunami et al. |
| 2008/0228837 A1* | 9/2008 | Davies et al. ............ 707/202 |
| 2012/0197846 A1* | 8/2012 | Peng et al. ............... 707/679 |

* cited by examiner

RESTORE SOFTWARE WITH AGGREGATED VIEW OF SITE COLLECTIONS

BACKGROUND OF THE INVENTION

1. Field of the Invention

This invention relates generally to the field of computer systems, and more particularly, to a system and method for restoring information which has been backed up from multiple databases.

2. Description of the Related Art

A web application is an application that is accessed through a network such as the Internet or an Intranet via a uniform resource locator (URL), e.g., where the URL specifies an address of a website that hosts the web application. The web application is implemented by one or more server computers on the server side which communicate with client computers on the client side. The client computers often use web browser programs to communicate with the server computers.

To aid users and organizations in developing and managing web applications, various web application development platforms have been developed by software vendors. One important feature of these platforms is the ability to manage the content used in the web application, such as the web pages (e.g., HTML or other markup language pages), scripts, images, multimedia, etc. A particular web application development platform may define a particular database format in which the web application content should be stored. The content for large or complex web applications may be divided into multiple content databases.

Organizations usually want to be able to backup their web applications, e.g., to periodically save a copy of the web content and other data used in the web application. The backup data may later be used to restore the web application to a previous state if necessary, e.g., in the event that the web application data becomes lost or corrupted. Since the content for the web application can be distributed across multiple databases, it can be challenging for users to find the appropriate backup data sets created from the different databases and restore the web application to a coherent state. It would thus be desirable to provide backup/restore software that enables a user to more easily restore a web application that uses multiple content databases.

SUMMARY

Various embodiments of a system and method for restoring information are disclosed. According to one embodiment of the method, a graphical user interface for restoring information to a web application may be displayed. Displaying the graphical user interface may include determining a plurality of databases used for the web application. For each respective database of the plurality of databases, one or more site collections stored in the database may be determined. Each site collection may include a set of data resources for the web application. Displaying the graphical user interface may further comprise displaying an aggregated view of the site collections stored in each database of the plurality of databases. The aggregated view may enable each site collection to be selected for restoration.

In further embodiments, displaying the graphical user interface may further include determining a recovery time corresponding to the site collections stored in each database of the plurality of databases. Displaying the graphical user interface may include displaying the aggregated view of the site collections in association with the recovery time. In some embodiments the plurality of databases may have been backed up by a backup job. Determining the recovery time corresponding to the site collections may comprise determining a time of the backup job.

In some embodiments displaying the aggregated view of the site collections may comprise displaying a selection GUI element proximal to each of the site collections. The selection GUI element for each respective site collection may be configured to receive user input selecting the respective site collection for restoration.

In some embodiments the aggregated view may display a name of each site collection stored in each database of the plurality of databases.

The method may further comprise backing up the plurality of databases prior to displaying the graphical user interface. In some embodiments backing up the plurality of databases may include storing topology information specifying that each database of the plurality of databases is included in the web application and specifying which site collections are in each database. The plurality of databases used for the web application and the one or more site collections stored in each database may be determined by accessing the topology information.

The method may further comprise receiving user input selecting one or more of the site collections for restoration, and restoring the selected site collections.

In various embodiments the plurality of databases may include any kind of databases. In some embodiments at least one of the databases is a SharePoint® content database.

BRIEF DESCRIPTION OF THE DRAWINGS

A better understanding can be obtained when the following detailed description is considered in conjunction with the following drawings, in which.

Figure 1:
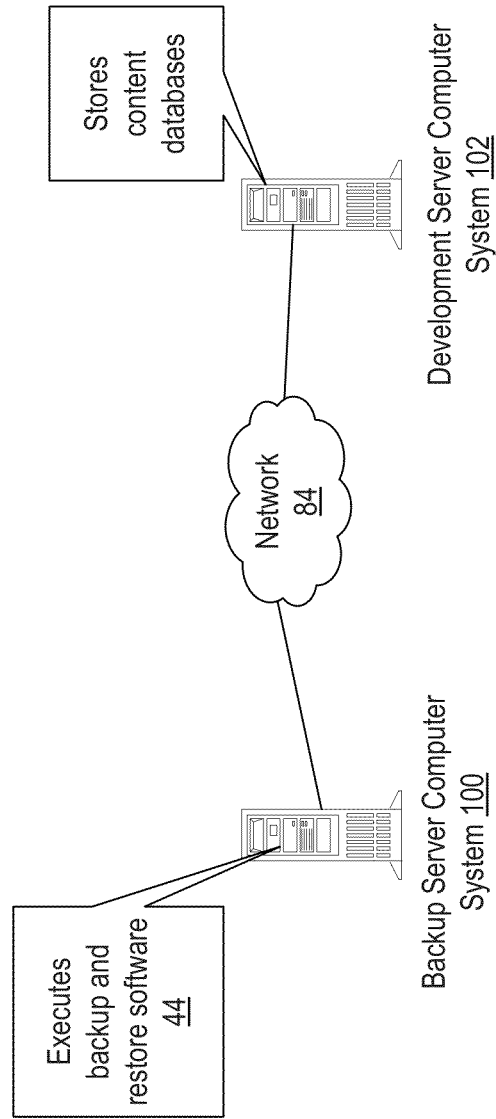
FIG. 1 illustrates one embodiment of a system for backing up and restoring a web application.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a system for backing up and restoring a web application. The web application may be developed using a web application development platform, e.g., a software product designed for creating and managing web applications. One example of a web application development platform is the Microsoft SharePoint® platform, although any other software application may be used to develop the web application in various embodiments.

The web application may use various data resources, such as web pages (e.g., HTML or other markup language pages), scripts, images, multimedia, etc., which are collectively referred to herein as the content of the web application. The web application development platform may define or use a particular database structure or format for storing the content of the web application. A database in which data resources for a web application is stored is referred to herein as a content database. In some web applications, the content may be distributed across multiple content databases, e.g., to facilitate the management of large or complex web applications. The web application developer may explicitly specify how the content is distributed across the multiple content databases (e.g., which content databases store which data resources), or the web application development platform may transparently handle how the content is distributed across the multiple content databases.

In addition to the ability to have multiple content databases, some web application development platforms may also provide a way to group together the data resources stored in a given content database into multiple sets or collections of data resources. Each set of data resources within a content database is referred to herein as a site collection. Thus, the web application can have one or more content databases, and each content database can have one or more site collections, where each site collection is a set of data resources used in the web application.

Microsoft SharePoint® is one example of a web application development platform that provides the ability to store multiple site collections in a single content database. In some embodiments the content databases used in the web application may be SharePoint® databases. As used herein, a SharePoint® database is a database created by a Microsoft SharePoint® product and/or created in accordance with a database specification or format used by Microsoft SharePoint®. In other embodiments the content databases may be any other kind of databases, e.g., databases created by any web application development platform or in accordance with any database specification or format.

In the example of FIG. 1, the content databases used in the web application are stored on the development server computer system 102, e.g., on a disk drive or other storage device of the development server computer system 102. For example, the content databases may be created and stored on the development server computer system 102 by the web application development platform. The software of the web application development platform can execute on the development server computer system 102 or on another computer system with which the development server computer system 102 communicates through the network 84. Although a single development server computer 102 is shown in FIG. 1, in various embodiments the content databases may be distributed across any number of computers. Also, the content databases may be stored on a development system, a production system, or any other type of system.

The development server computer system 102 may be coupled via a network 84 to a backup server computer system 100. The backup server computer system 100 may be configured to execute backup and restore software 44. The backup and restore software 44 may backup the content databases stored on the development server computer system 102, e.g., to save backups of the content databases in the event that the backups are needed later to restore the content databases to an earlier state. For example, in some embodiments an administrator may configure the backup and restore software 44 with scheduling information to cause the backup and restore software 44 to periodically create backup data sets from the content databases of the web application. The backup data sets may be stored on the backup server computer system 100, on the development server computer system 102, or on any other computer system or storage device coupled to the backup server computer system 100.

In addition to backing up the content databases, the backup and restore software 44 may also provide restore functionality to enable an administrator to restore content databases which were previously backed up by the backup and restore software 44. The backup and restore software 44 may display a restoration graphical user interface (GUI) which enables a user to select which data to restore to the web application, e.g., by selecting which content database(s) and/or which site collection(s) to restore. Once the user has selected the desired data and requested the restoration to be initiated, the backup and restore software 44 may restore the selected data to the web application using the corresponding backup data set(s). Restoring the selected data may include restoring one or more of the content databases of the web application to a previous state (e.g., to its state at the time when the backup data set was created) and/or restoring one or more of the site collections in one or more of the content databases to a previous state. Various methods for aiding a user or administrator in restoring the web application are described in detail below.

Referring again to FIG. 1, although a single backup server computer 100 is shown in this example, in some embodiments the functionality of the backup and restore software 44 may be distributed across multiple computers, e.g., where the multiple computers communicate via the network 84. Also, the backup and restore software 44 may be split into a server side which executes on the backup server computer system 100 and a client side which executes on the development server computer system 102 where the content databases of the web application are stored. When performing a backup, the server side of the backup and restore software 44 may communicate with the client side to retrieve the necessary data for creating an incremental or full backup of a content database. In other embodiments the backup and restore software 44 may execute on the development server computer system 102, and there may not be a separate backup server computer system 100.

The network 84 coupling the backup server computer system 100 to the development server computer system 102 may include any type of network or combination of networks. For example, the network 84 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. The computer systems may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11, among others.

Figure 2:
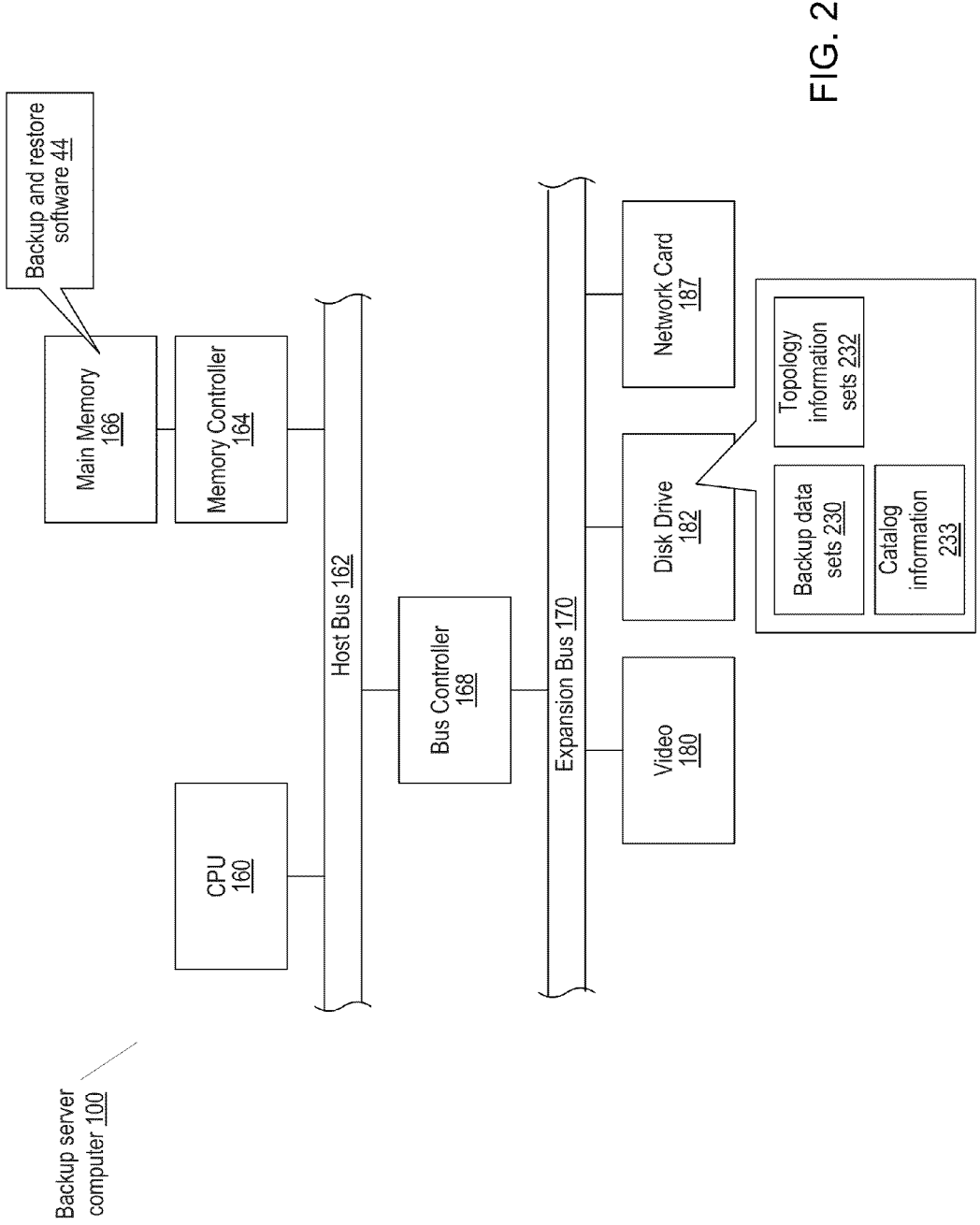
FIG. 2 illustrates one embodiment of a backup server computer system used in the system.

FIG. 2 illustrates one embodiment of the backup server computer system 100 in more detail. In general, the backup server computer system 100 may include any kind of computing device(s), such as one or more personal computer systems (PC), workstations, network appliances, distributed computer systems, or other computing devices or combinations of devices. In general, the term "computer system" is broadly defined to encompass any device (or combination of devices) having at least one processor that executes instructions from one or more storage mediums. FIG. 2 illustrates a representative PC embodiment. Elements of a computer not necessary to understand the present description have been omitted for simplicity.

The backup server computer system 100 may include at least one central processing unit or CPU (processor) 160 which may be coupled to a processor or host bus 162. The processor 160 may be any of various types. For example, in some embodiments, the processor 160 may be compatible with the x86 architecture, while in other embodiments the processor 160 may be compatible with the SPARC™ family of processors. Also, in some embodiments the backup server computer system 100 may include multiple processors 160.

The backup server computer system 100 may also include memory 166 in which program instructions implementing the backup and restore software 44 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the backup server computer system 100. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, and a network card or device 187 that enables the backup server computer system 100 to send and receive information over a network.

In the example of FIG. 2, a disk drive 182 is also coupled to the expansion or input/output bus 170. The disk drive 182 may store backup data sets 230 created by the backup and restore software 44 when backing up the content databases of the web application. The backup data sets may include the actual data copied from the content databases. A given backup data set may be a full backup including all the data necessary to completely restore a given content database to its state at a particular time, or may be an incremental backup that depends on another backup data set and includes only the data necessary to effect an incremental change in a given content database.

In addition to the backup data sets, the backup and restore software 44 may also create metadata describing the backup data sets or describing the state of the web application, and may store the metadata along with the backup data sets. For example, FIG. 2 illustrates topology information sets 232 which have been stored along with the backup data sets 230. In some embodiments, each time a backup is performed to create a new backup data set, the backup and restore software 44 may also create a corresponding topology information set 232 which describes the topology of the web application at the time the backup is performed. The topology information set 232 may specify which content databases are included in the web application and which site collections are stored in the content databases. This information can change over time, so the topology information sets 232 can be different for different backup data sets. For example, new content databases can be added to the web application over time, or existing content databases can be merged or deleted. Similarly, site collections can be added or deleted over time or can be moved to different content databases.

In addition to the backup data sets 230 and the topology information sets 232, the backup and restore software 44 may also create and store other information when performing the backups of the web application, such as catalog information 233. The catalog information 233 may describe the backup data sets 230, such as which content databases and/or which site collections within the content databases have been backed up in a given backup data set, the time the backup data set was created, etc. When performing a restoration, the backup and restore software 44 may use the catalog information 233 to determine which backup data sets and recovery times are available and present these to the user in the restoration GUI.

In other embodiments the backup data sets 230, topology information sets 232, and catalog information 233 may be stored across multiple disk drives, or may be stored on another kind of storage device other than a disk drive. Examples of other kinds of storage devices include solid state drives, optical drives, tape drives, etc. The storage device(s) on which the information is stored may be included in or coupled to the backup server computer system 100 in any of various ways, e.g., via an input/output bus, via a network, via a wireless connection, etc.

In some embodiments the development server computer system 102 may include similar components as those illustrated in FIG. 2. In some embodiments at least some modules of the backup and restore software 44 may execute on the development server computer system 102, e.g., to facilitate backup from and restoration to the development server computer system 102.

Figure 3:
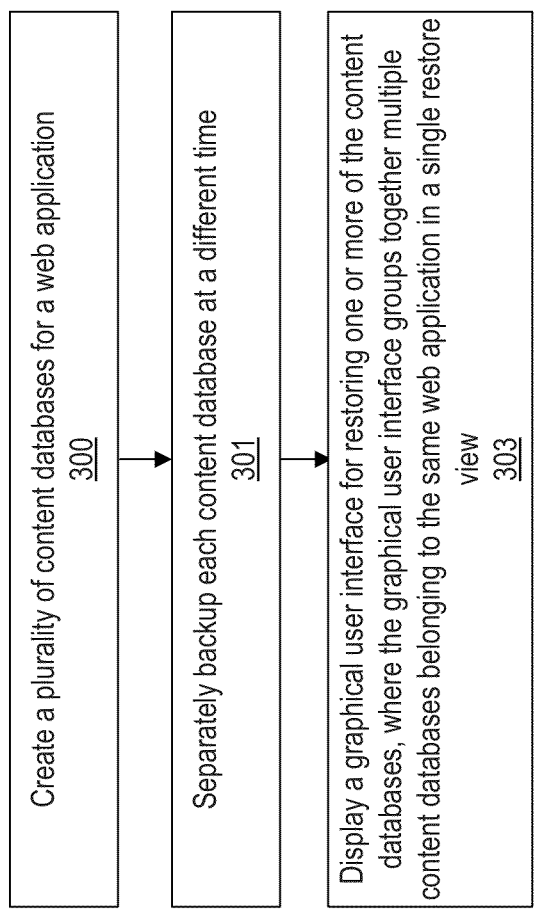
FIG. 3 is a flowchart diagram illustrating one embodiment of a method for backing up and restoring multiple content databases for a web application.

FIG. 3 is a flowchart diagram illustrating one embodiment of a method for backing up and restoring multiple content databases for a web application. As indicated in block 300, a plurality of content databases may be created for the web application. For example, the web application development platform used to develop the web application may provide a user interface that enables a user to add new content databases to the web application, name the content databases, add data resources to the content databases, move data resources between content databases, etc. Thus, the user may interact with the web application development platform to create the content databases and store various data resources in them.

As indicated in block 301, the content databases may be separately backed up at different times. For example, the user may interact with the backup and restore software 44 to configure a backup schedule in which different content databases are backed up by different backup jobs, where the backup jobs are scheduled to be performed at different times. Each time a backup job is initiated, the backup and restore software 44 may create a new backup data set to store the data for the content database to which the backup job corresponds. A given backup data set may be stored in various ways, e.g., as one or more files.

The content databases may be backed up separately from each other, e.g., so that different content databases are backed up seconds, minutes, hours, or days apart from each other. As one example, one backup job could be scheduled to run daily at 1:00 am to backup one content database of the web application, and another backup job could be scheduled to run daily at 2:00 am to backup another content database of the web application. As another example, one backup job could be scheduled to run weekly on Mondays at 10:00 pm to backup one content database, and another backup job could be scheduled to run weekly on Wednesdays at 10:00 pm to backup another content database. In various embodiments, any other backup schedule may be specified for any number of two or more databases. The result will be multiple backup data sets corresponding to different content databases.

Although it may be possible to backup the multiple content databases to a single backup data set created by a single backup job, it may sometimes be desirable to instead backup the content databases separately from each other as shown in block 301 (e.g., such that the data from different respective databases is stored in different respective backup data sets). For example, if the content databases are large or if there are many of them, there may not be an available time window large enough to backup all the content databases. Splitting the backups of the content databases into separate backup jobs can allow each backup job to run for shorter periods of time, thus enabling computing resources to be devoted to tasks other than backups.

Although it may be desirable to backup the content databases separately from each other, from the user's point of view this could potentially make the restoration process more difficult. The user who is performing the restoration may not be the same person as the user who configured the backup schedule. Thus, the user performing the restoration may not know when the backup jobs for the various content databases of the web application are scheduled, which may make it difficult to find all the backup data sets needed to restore all the content databases. In addition, if multiple content databases are being restored, it is generally desirable to restore them from backup data sets that were created as closely in time with each other as possible so that the content databases will be coherent with respect to each other. However, if there are many content databases which are all being periodically backed up, it can be difficult for the user to sort through the available backup data sets and decide which particular backup data set to restore each content database. Furthermore, it may also be difficult for the user to even know exactly which content databases belonged to the web application at the time the user wants the web application to be restored to. As noted above, content databases can be added to or deleted from the web application over time so even if the user knows which content databases are currently used in the web application, he may not know which content databases were used in the web application at the particular time in the past which is being used for recovery.

To address these issues, the backup and restore software 44 may aid the user in performing a restoration of a web application that uses multiple content databases that have been backed up separately from each other at separate times. As indicated in block 303, the backup and restore software 44 may display a graphical user interface (GUI) for restoring one or more of the content databases. The GUI may group together multiple content databases belonging to the same web application in a single restore view. The single restore view may display all of the content databases that belonged to the web application at a selected recovery time. All of the content databases may be displayed together with each other so as to enable the user to easily select which content database(s) to restore from the single view within the GUI, e.g.,
without needing to separately navigate to each individual content database in order to select it for restoration.

Figure 4:
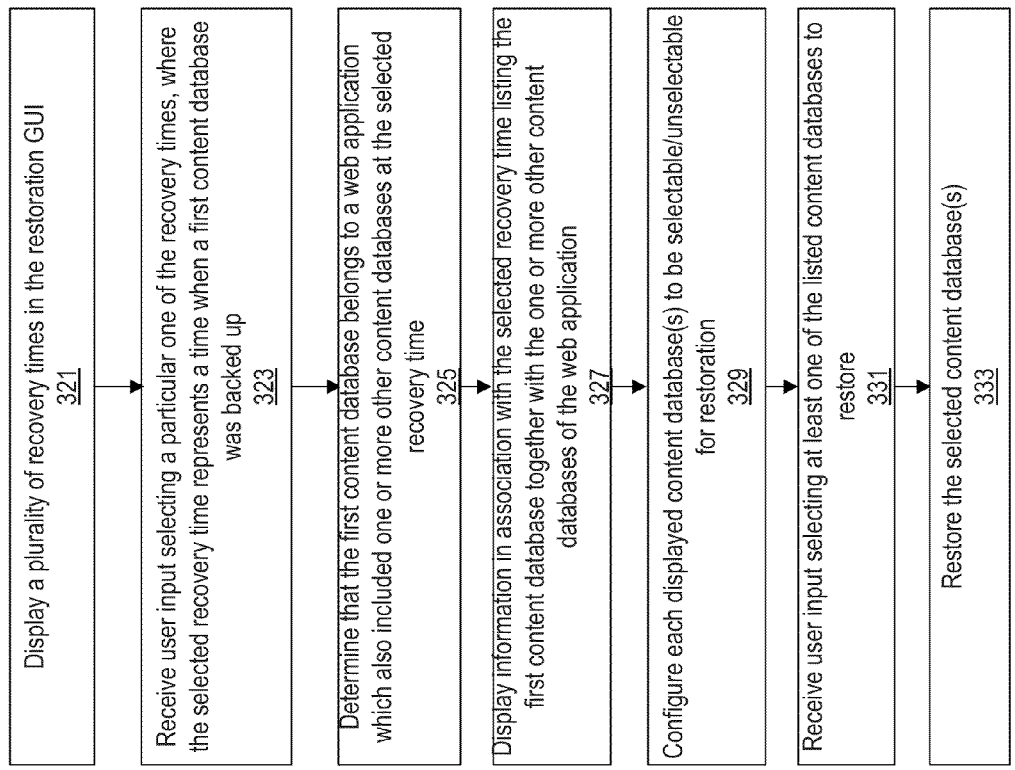
FIG. 4 is a flowchart diagram illustrating one embodiment of a method for displaying a restoration GUI for restoring the multiple content databases.

FIG. 4 is a flowchart diagram illustrating one embodiment of a method for displaying a restoration GUI for restoring one or more of the content databases. The method may be implemented by the backup and restore software 44 executing on the backup server computer system 100 and/or the development server computer system 102. The backup and restore software 44 may display the restoration GUI on a display device of the backup server computer system 100, the development server computer system 102, or on a display device of another computer system.

As indicated in block 321, the backup and restore software 44 may display a plurality of recovery times in the restoration GUI. For example, the backup and restore software 44 may determine which backup data sets have previously been created by backup jobs and may determine when each of the backup data sets was created, e.g., by examining the catalog information 233. The recovery times that are displayed in block 321 may be the same as the backup times when the backup data sets were created. (The time when each respective backup set was created is referred to as a "recovery time" since the content database corresponding to the respective backup data set may be recovered to that time by selecting the respective backup data set for restoration.)

As indicated in block 323, the backup and restore software 44 may receive user input selecting a particular one of the recovery times that were displayed in block 321. The selected recovery time may represent a particular time when a first content database of a web application was backed up to a particular backup data set. As indicated in block 325, the backup and restore software 44 may determine that the web application also included one or more other content databases at the selected recovery time. When the first content database was backed up, the backup and restore software 44 may have also created and stored a corresponding topology information set 232 that specifies which content databases were included in the web application at the time the backup data set was created. Thus, the backup and restore software 44 may access the topology information set 232 corresponding to the backup data set in order to determine the complete set of content databases that were included in the web application at the selected recovery time.

As indicated in block 327, the backup and restore software 44 may display information in association with the selected recovery time listing the first content database together with the one or more other content databases of the web application. For example, the name of the first content database may be displayed or listed together with the names of the one or more other databases. The set of content databases may be displayed in association with the selected recovery time, e.g., by displaying them proximally to the selected recovery time or in a separate portion of the GUI corresponding to the selected recovery time so that the user can easily visually associate the set of content databases with the selected recovery time.

Displaying a single view of the first content database together with the one or more other content databases may visually indicate to the user that this is the complete set of content databases that were included in the web application at the selected recovery time. The GUI may allow the user to select the complete set of content databases for restoration or to select individual ones to be restored, as desired. However, it is possible that one or more of the content databases may not be available for restoration at the selected recovery time. As indicated in block 329, the backup and restore software 44 may determine whether each content database is available for restoration at the selected recovery time, and may configure each content database displayed in block 327 to be either selectable for restoration or unselectable for restoration. For example, if no backup of a given content database of the web application had yet been created at the selected recovery time then that content database cannot be restored to the selected recovery time, and so may not be configured to be selectable by the user in the GUI. Even though the user may not be able to select that content database at the selected restoration time, it may still be useful to display the content database with the other content databases of the web application to inform the user that it also belonged to the web application at the selected recovery time. The user can then navigate to a different (later) recovery time to attempt to find a later point in time when all the content databases of the web application are available for restoration.

Since the various content databases were separately backed up in different backup jobs, when the user selects a particular recovery time corresponding to a backup job for a first content database, the selected recovery time may not exactly match the times when the other content databases of the web application were backed up. For each of the other content databases, the backup and restore software 44 may determine which backup data set (if any) containing backup data for that content database was created closest in time to, and not later in time than, the selected recovery time. If no such backup data set is found then the content database may be marked as unselectable in the GUI. Otherwise, the content database may be marked as selectable in the GUI. If the user then selects that content database and requests it to be restored then the backup and restore software 44 can use the corresponding backup data set to restore the content database. The time when the backup data set was created can also be displayed in the GUI along with the content database so that the user can see exactly which times the restoration of each content database will be based upon.

As indicated in block 331, the backup and restore software 44 may receive user input selecting at least one of the listed content databases to restore. The backup and restore software 44 may then restore the selected content database(s), to the development server computer system 102 or another target location, as indicated in block 333. For example, the selected content database(s) may be modified (or created if they do not already exist) at the target location so that they are effectively rolled back to the state in which they existed at the time they were backed up.

Figure 5:
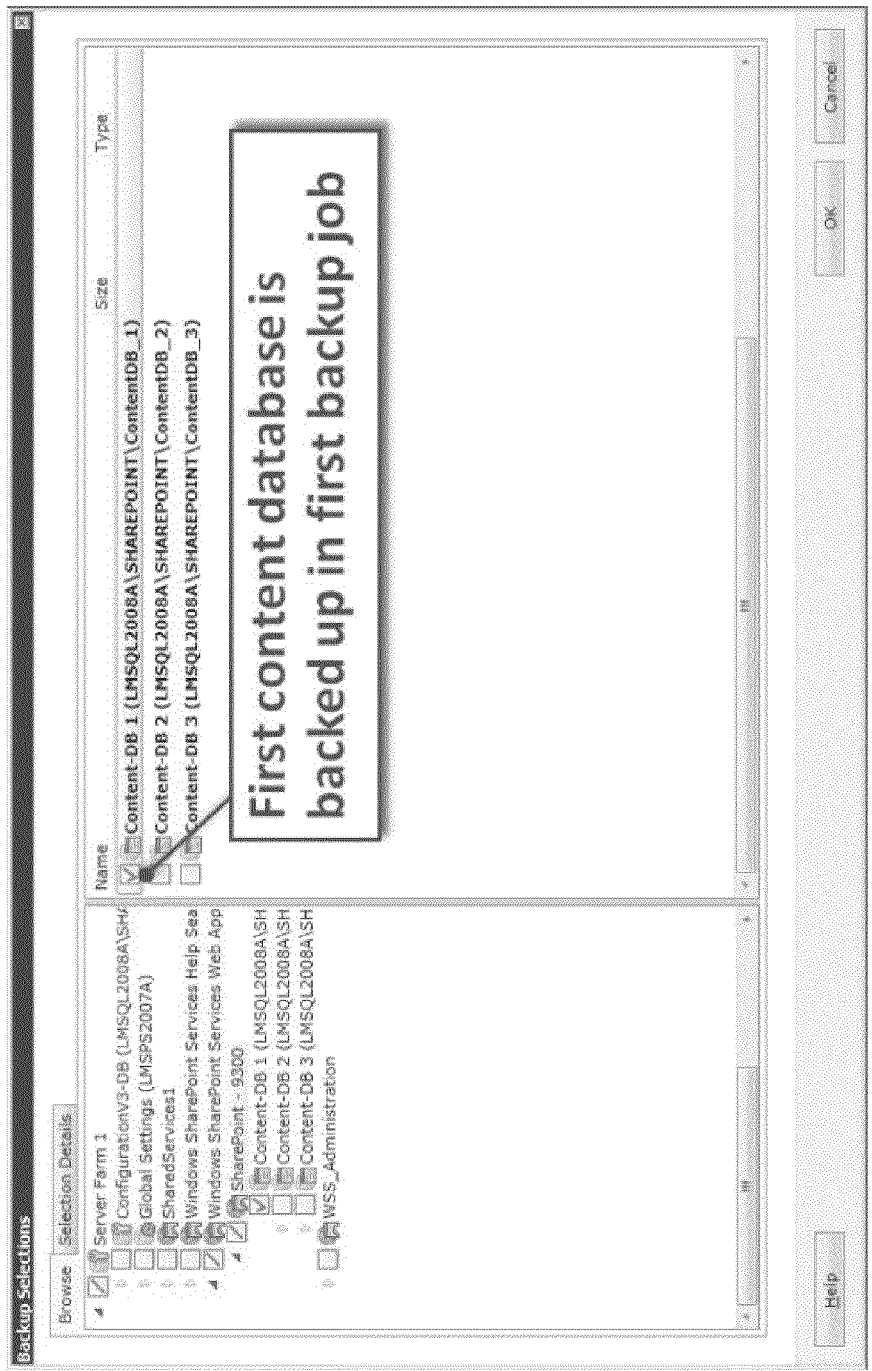
FIGS. 5-13 illustrate an example of backing up and restoring a web application that has three content databases.
Figure 6:
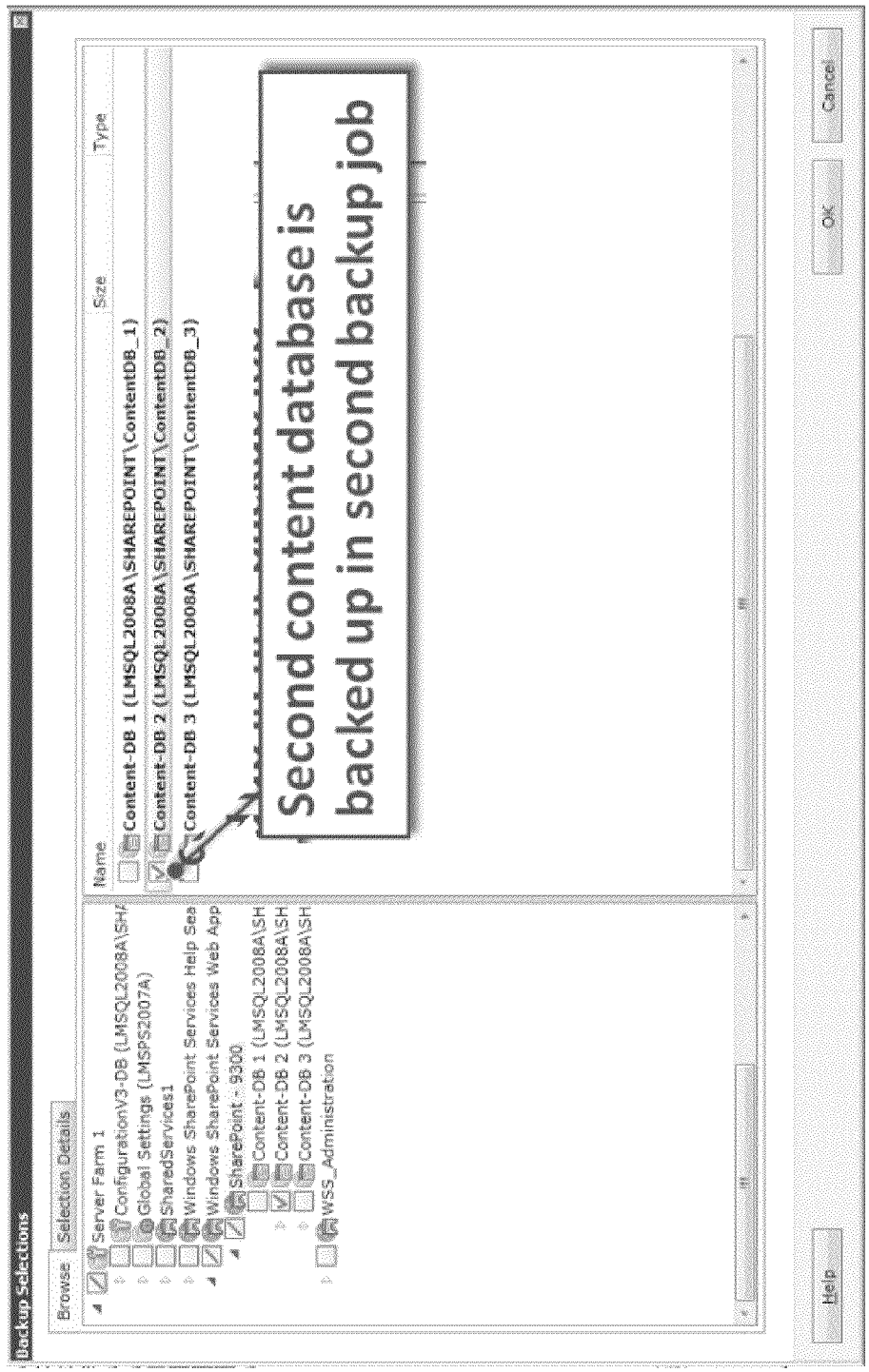
Figure 7:
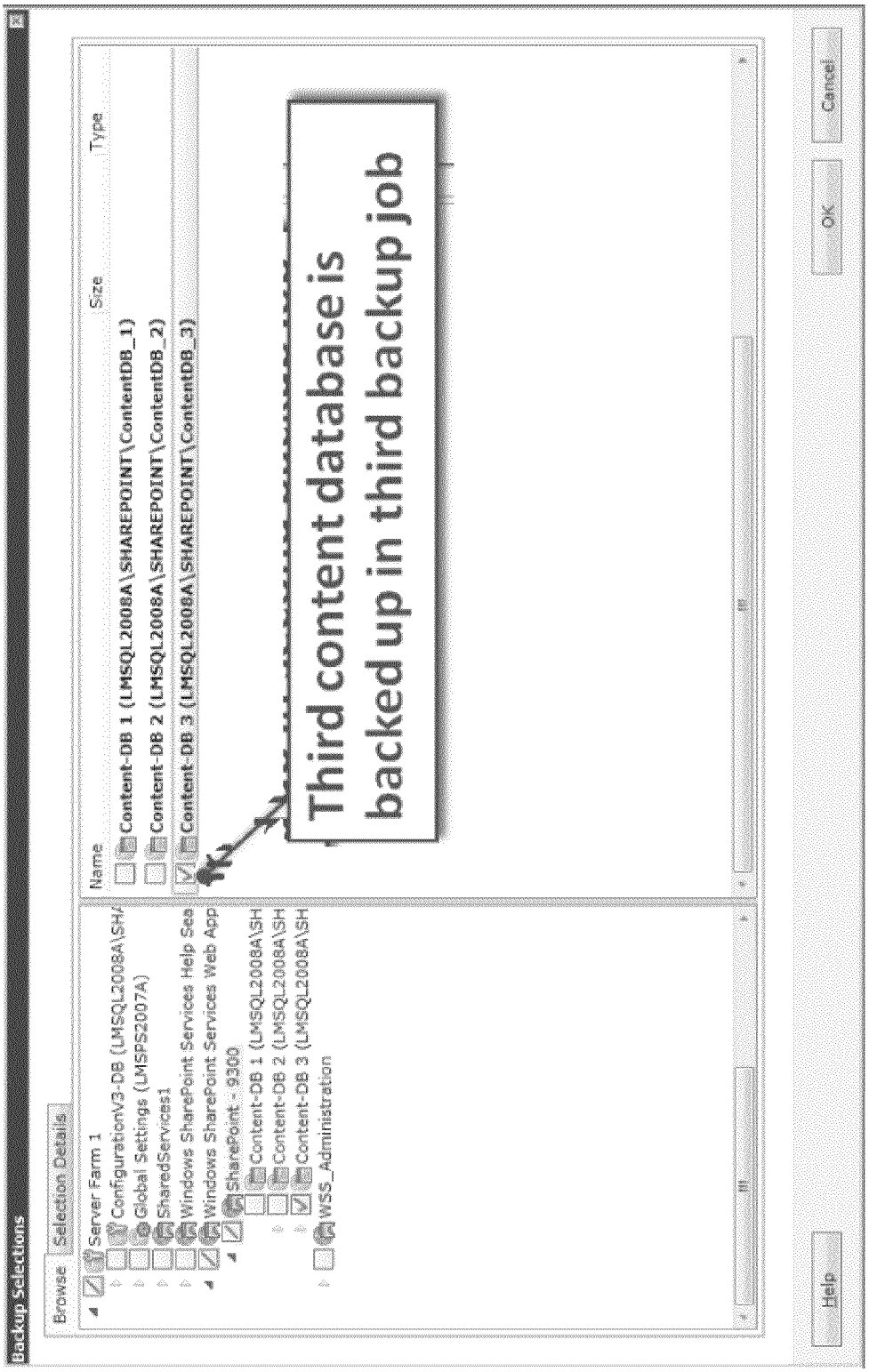

FIGS. 5-13 illustrate an example of backing up and restoring a web application that has three content databases named Content-DB_1, Content-DB_2, and Content-DB_3. The backup and restore software 44 is configured to perform different backup jobs to separately backup each of the three content databases, as shown in FIGS. 5-7.

Figure 8:
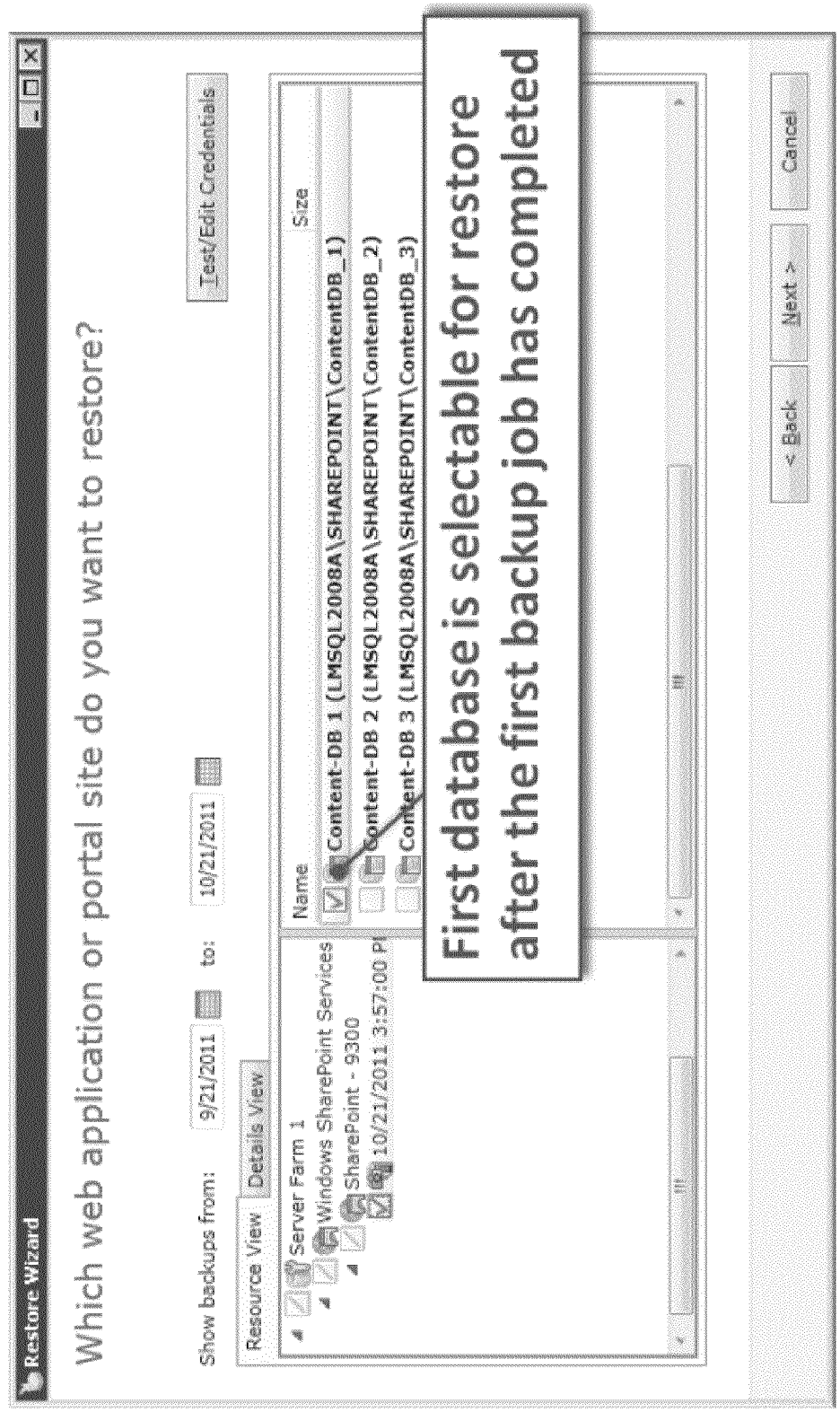
Figure 9:
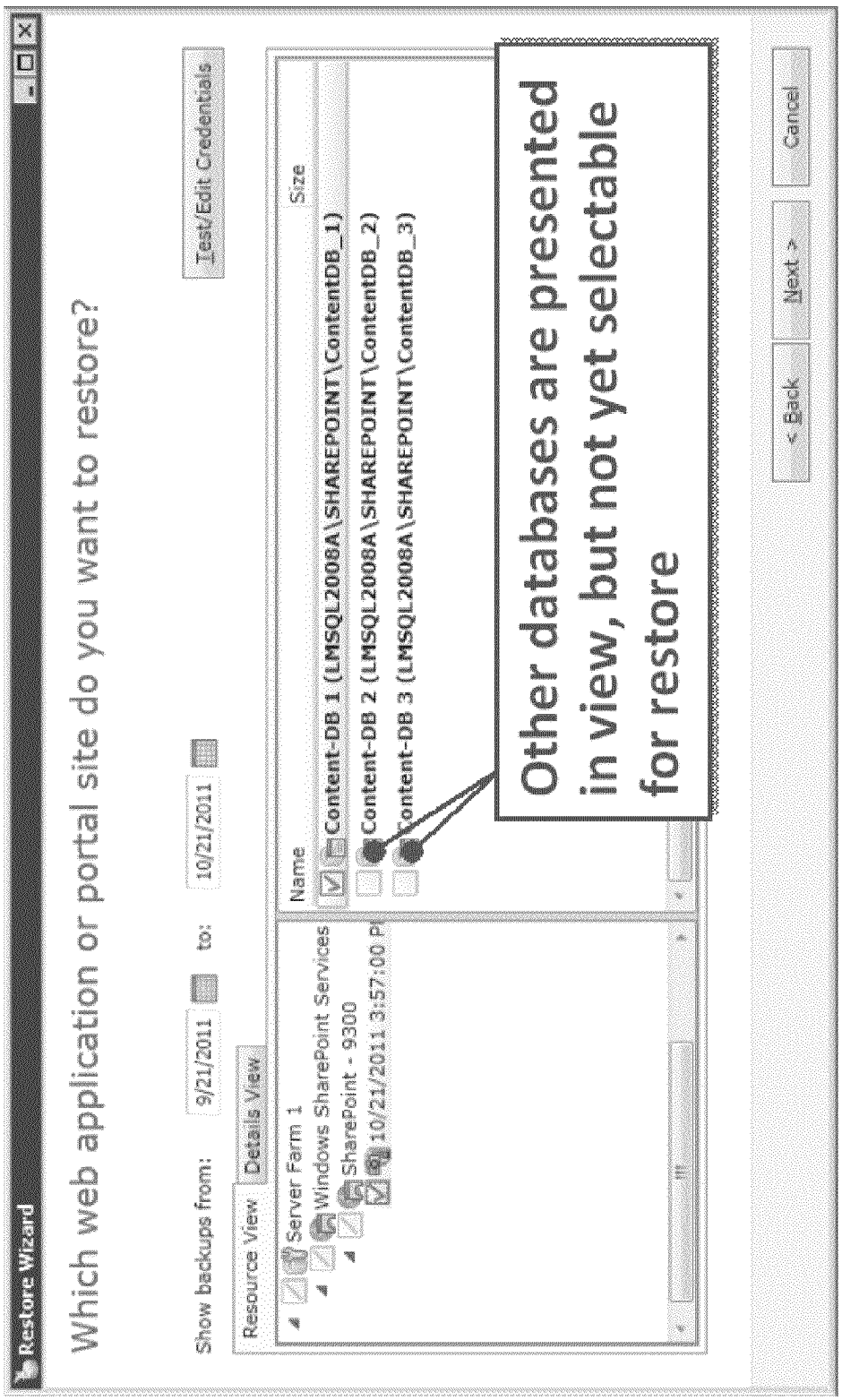

FIGS. 8-13 illustrate an example of a restoration GUI similar to the one described above with reference to FIGS. 3 and 4. In other embodiments the restoration GUI may take on any of various other appearances. FIG. 8 illustrates the restoration GUI at a time after the first backup job backing up the content database Content-DB 1 has completed, but before the other two backup jobs backing up the other two content databases have completed. Thus, the only available recovery time displayed in the restoration GUI is the time 10/21/2011 3:57:00 PM when the content database Content-DB 1 was backed up. The right-hand side of the GUI (the right pane of the window) is used to display information corresponding to whatever item is selected in the left-hand side of the GUI. In FIG. 8, the user has selected the recovery time 10/21/2011 3:57:00 PM. In response to the user's selection, the backup and restore software 44 determines that the selected recovery time corresponds to the backup of the content database Content-DB 1 and displays this content database in the right side of the GUI and makes it available for restoration, as shown in FIG. 8. The backup and restore software 44 also determines that at the selected recovery time, the web application also included the two other content databases Content-DB 2 and Content-DB 3. Thus, the backup and restore software 44 also displays these other two content databases in the right side of the GUI, as shown in FIG. 9. However, these two content databases are made unavailable for selection since they do not have any backups available on or before the selected recovery time.

Figure 10:
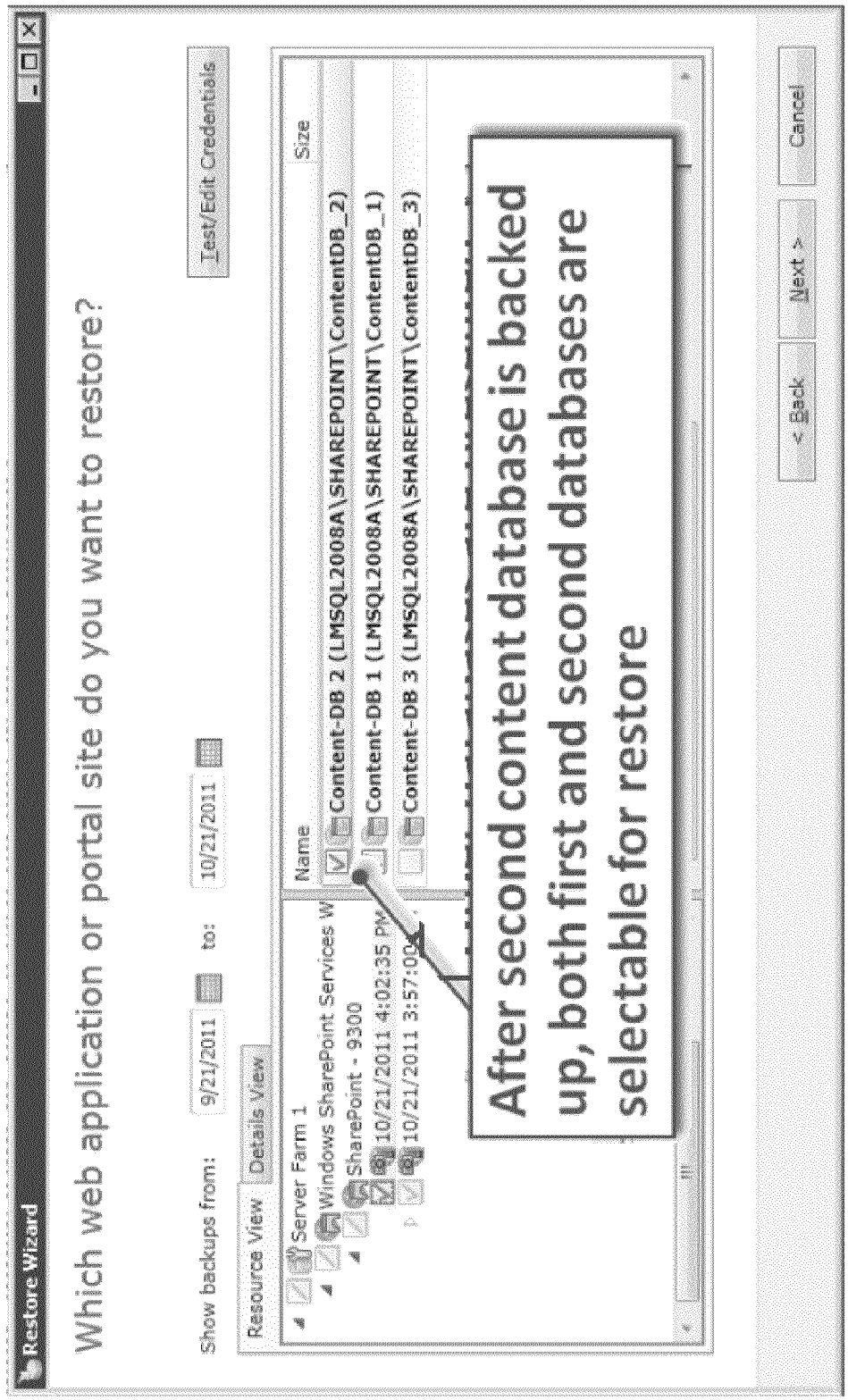
Figure 11:
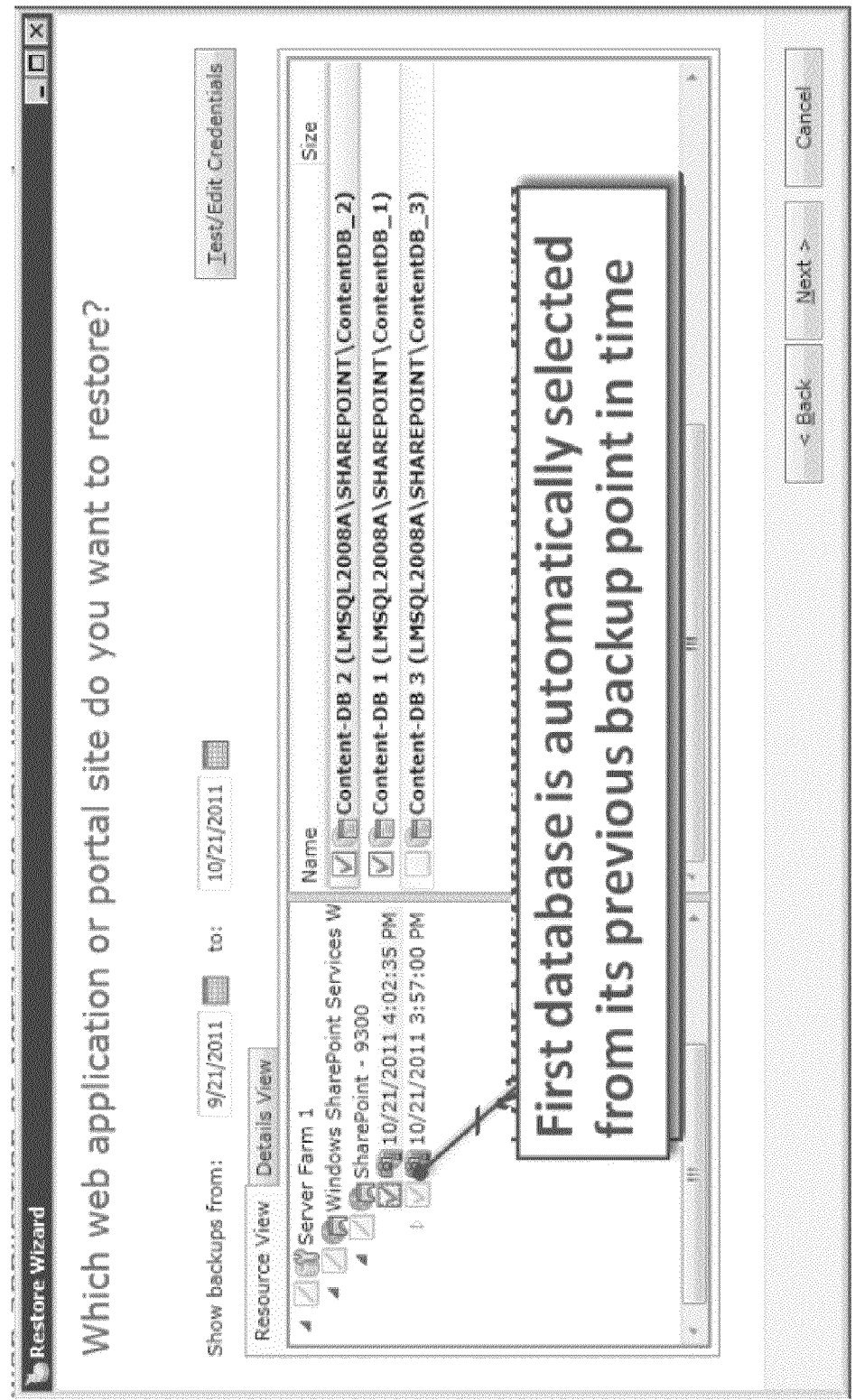

FIG. 10 illustrates the restoration GUI at a time after the second backup job backing up the content database Content-DB 2 has completed, but before the other backup job backing up the third content database has completed. Both of the backup times for both of the completed backup jobs are displayed as available recovery times that the user can select. In FIG. 10 the user has selected the backup time of the second backup job, 10/21/2011 4:02:35 PM. In response, the backup and restore software 44 again displays the complete set of all three content databases of the web application in the right side of the GUI. However, the second content database Content-DB 2 is now selectable in addition to the first content database Content-DB 1. The third content database Content-DB 3 is still not available for selection in the GUI since it does not have any backups available on or before the selected recovery time.

The user can select to restore one or both of the content databases Content-DB 1 or Content-DB 2. If the user selects to restore the content database Content-DB 2 then the backup data set created at the selected recovery time will be used for the restore of this content database. If the user selects to restore the content database Content-DB 1 then the backup data set created at the earlier time (10/21/2011 3:57:00 PM) will be used for the restore of this content database. As shown in the right side of FIG. 11, the user has checked both the content databases Content-DB 1 and Content-DB 2 to be restored. In response, the backup and restore software 44 has automatically checked the earlier time (10/21/2011 3:57:00 PM) displayed on the left side of the GUI in addition to the recovery time (10/21/2011 4:02:35 PM) which was selected by the user. This indicates to the user that the content database Content-DB 1 will be restored from a backup set created earlier than the recovery time selected by the user.

Figure 12:
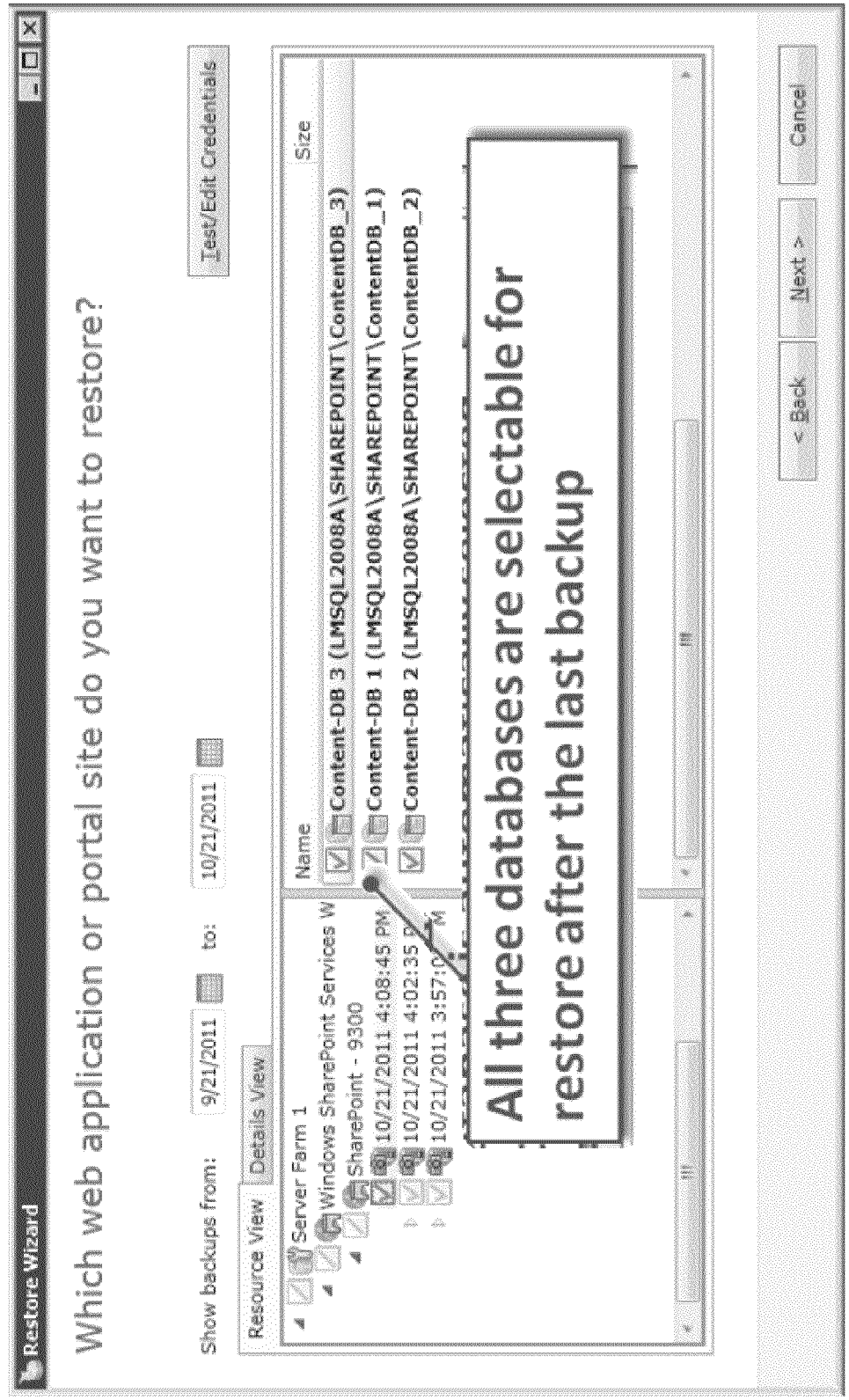
Figure 13:
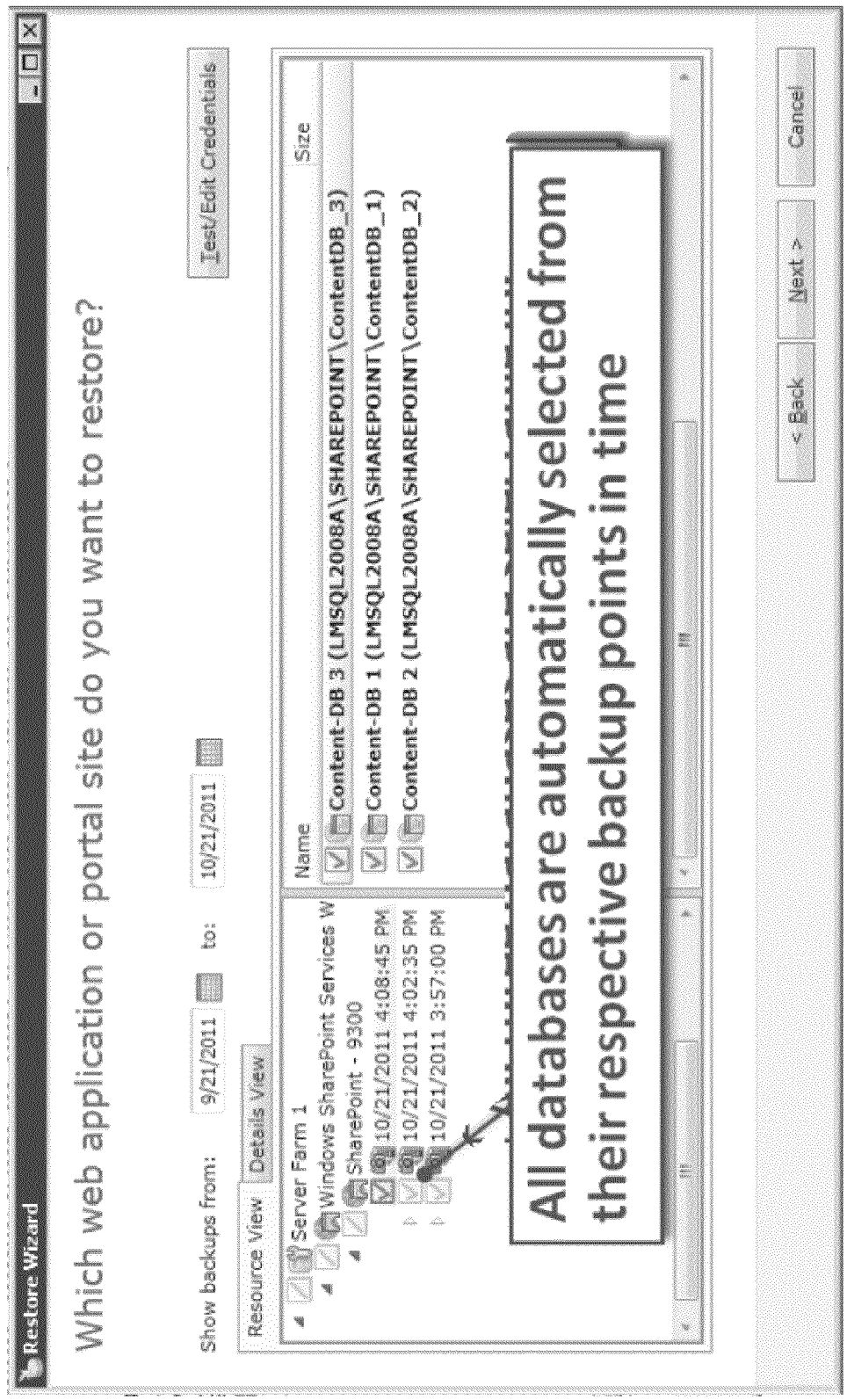

FIG. 12 illustrates the restoration GUI at a time after the third backup job backing up the content database Content-DB 3 has completed. The backup times for all three content databases are displayed as available recovery times that the user can select. In FIG. 12 the user has selected the backup time of the third backup job, 10/21/2011 4:08:45 PM. In response, the backup and restore software 44 again displays the complete set of all three content databases of the web application in the right side of the GUI. However, the third content database Content-DB 3 is now selectable in addition to the other two content databases. As shown in the right side of FIG. 12, the user has checked all three content databases to be restored. In response, the backup and restore software 44 has automatically checked the earlier recovery times corresponding to the backups of the content databases Content-DB 1 and Content-DB 2 in addition to the recovery time of the content database Content-DB 3 which was selected by the user, as shown in FIG. 13. This indicates to the user that the content databases Content-DB 1 and Content-DB 2 will be restored from backup sets created earlier than the recovery time selected by the user.

Displaying all of the content databases together with each other in a single view as discussed above may enable the user to easily see which content databases were part of the web application at the selected recovery time. It may also provide a convenient way for the user to quickly and easily select multiple ones of the content databases (e.g., all of them) for restoration. In a less efficient GUI the user may have to make an effort to learn which content databases were part of the web application at a given time. In a less efficient GUI the user may also have to navigate to different recovery times and/or navigate to different content databases in order to select all the content databases that need to be restored. In contrast, a restoration GUI such as shown in FIGS. 8-13 may enable the user to restore all the content databases of the web application with minimal navigation. For example, the user may simply navigate to one of the available recovery times, thus causing all of the content databases to be displayed in association with the selected recovery time. The user may then be able to select all of the content databases for restoration without the need to navigate to another recovery time. The user may also not be required to navigate separately to the different content databases.

In other embodiments the restoration GUI may provide additional or alternative ways to restore content of a web application. For example, if the data resources of the web application are organized into multiple site collections then it may be desirable to enable the user to efficiently restore individual site collections to the web application. Since each content database can store one or more site collections this may provide a more granular restoration technique that enables the user to perform restores at a finer level of granularity than the content database level.

Figure 14:
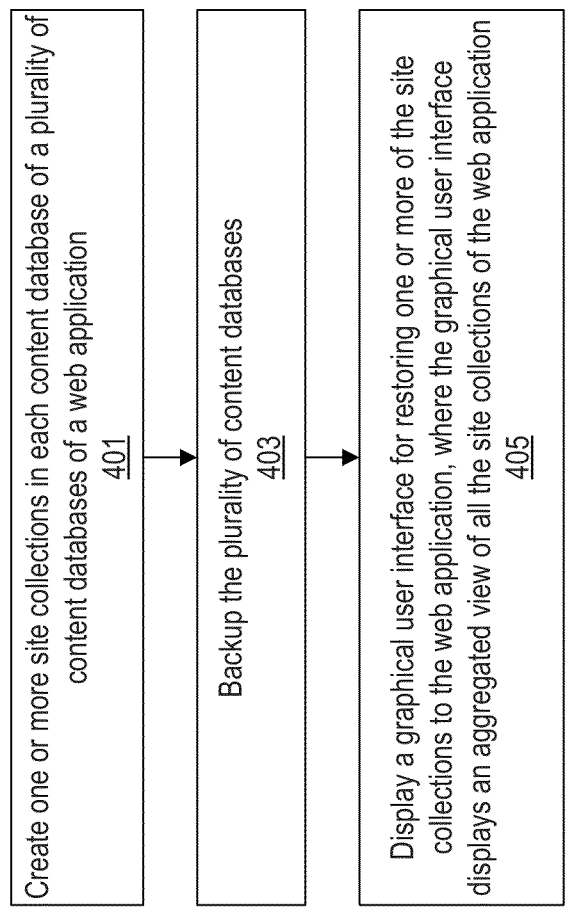
FIG. 14 is a flowchart diagram illustrating one embodiment of a method for backing up and restoring multiple site collections from and to a web application.

FIG. 14 is a flowchart diagram illustrating one embodiment of a method for backing up and restoring multiple site collections from and to a web application. As indicated in block 401, one or more site collections may be created within each content database of a plurality of content databases, e.g., via user interaction with the web application development platform. Thus, each content database includes at least one site collection.

As indicated in block 403, each content database of the plurality of content databases may be backed up by the backup and restore software 44. In some embodiments each content database may be backed up separately from the others so that the backup data for the content databases are stored in different backup data sets created at different times.

As indicated in block 405, the backup and restore software 44 may display a restoration GUI for restoring one or more of the site collections to the web application. The graphical user interface may display an aggregated view of all the site collections of the web application. The graphical user interface may make it easy for the user to see the full set of set collections of the web application at a given recovery time, and may also enable the user to select the full set of site collections for restoration or to select the individual site collections of interest without having to separately navigate to or select the individual content databases in which the site collections are stored.

Figure 15:
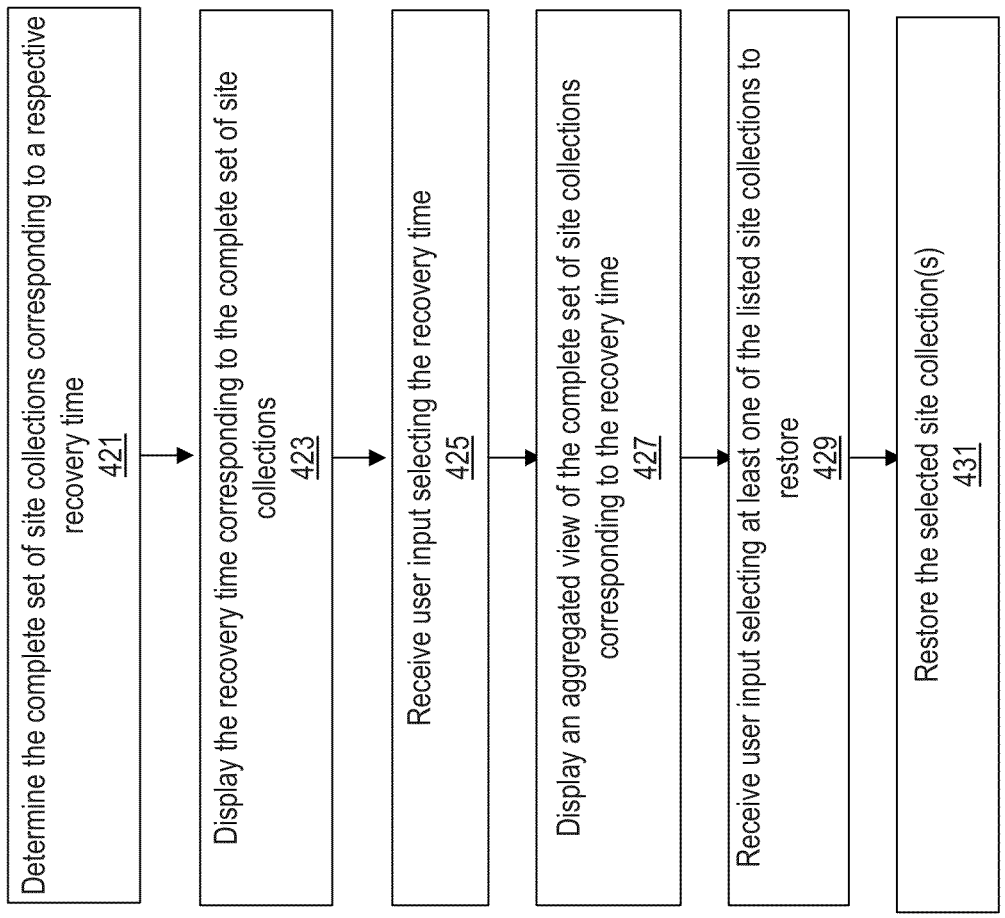
FIG. 15 is a flowchart diagram illustrating one embodiment of a method for displaying a restoration GUI for restoring the multiple site collections.

FIG. 15 is a flowchart diagram illustrating one embodiment of block 405 of FIG. 14 in more detail. The method of FIG. 15 may be implemented by the backup and restore software 44 executing on the backup server computer system 100 and/or the development server computer system 102.

In block 421, the backup and restore software 44 may determine a complete set of site collections corresponding to a respective recovery time. The complete set of site collections corresponding to the recovery time is the set of all site collections that were in the web application at the recovery time. In some embodiments a single backup job may be configured to backup all of the content databases of the web application. The content of each content database may still be stored separately in different backup data sets, but the overall backup job may still have a single backup time for all of the content databases, e.g., the time when the backup job began or ended. The single backup time for the backup job may be taken as the recovery time for the complete set of site collections. The complete set of site collections corresponding to the recovery time is the aggregated set of site collections present in all of the content databases backed up by the backup job. The backup and restore software 44 may determine which content databases were present in the web application at the recovery time, e.g., using the topology information 232 that was created at the recovery time. Once the complete set of content databases is known, the complete set of site collections may be determined, e.g., by accessing the topology information to determine which site collections were present in each of the respective content databases at the time of the backup job.

As indicated in block 423, the backup and restore software 44 may display the recovery time corresponding to the complete set of site collections. The recovery time may be displayed in the restoration GUI so that it can be selected by the user. If the content databases have each been backed up multiple times then there may be multiple recovery times from which the site collections can be restored. Thus, in some embodiments the backup and restore software 44 may determine that there are multiple complete sets of site collections that are available for restoration. The backup and restore software 44 may display the respective recovery time corresponding to each complete set of site collections so that the user can select the desired recovery time upon which to base the restoration. In various embodiments the backup and restore software 44 may use any algorithm or heuristic to determine how to group together the site collections into complete sets of site collections and determine the recovery time for each complete set of site collections. For example, in some embodiments a backup job may be configured to periodically backup all of the content databases, and each time the backup job is performed it may produce a corresponding recovery time from which a corresponding complete set of site collections may be restored.

As indicated in block 425, the backup and restore software 44 may receive user input selecting one of the recovery times displayed in the GUI. In response, the backup and restore software 44 may display an aggregated view of the complete set of site collections corresponding to the selected recovery time, as indicated in block 427. For example, the backup and restore software 44 may list all the site collections that were stored in all the content databases of the web application at the selected recovery time. The backup and restore software 44 may receive user input selecting at least one of the listed site collections to restore, and may then restore the selected site collection(s), as indicated in blocks 429 and 431.

Figure 16:
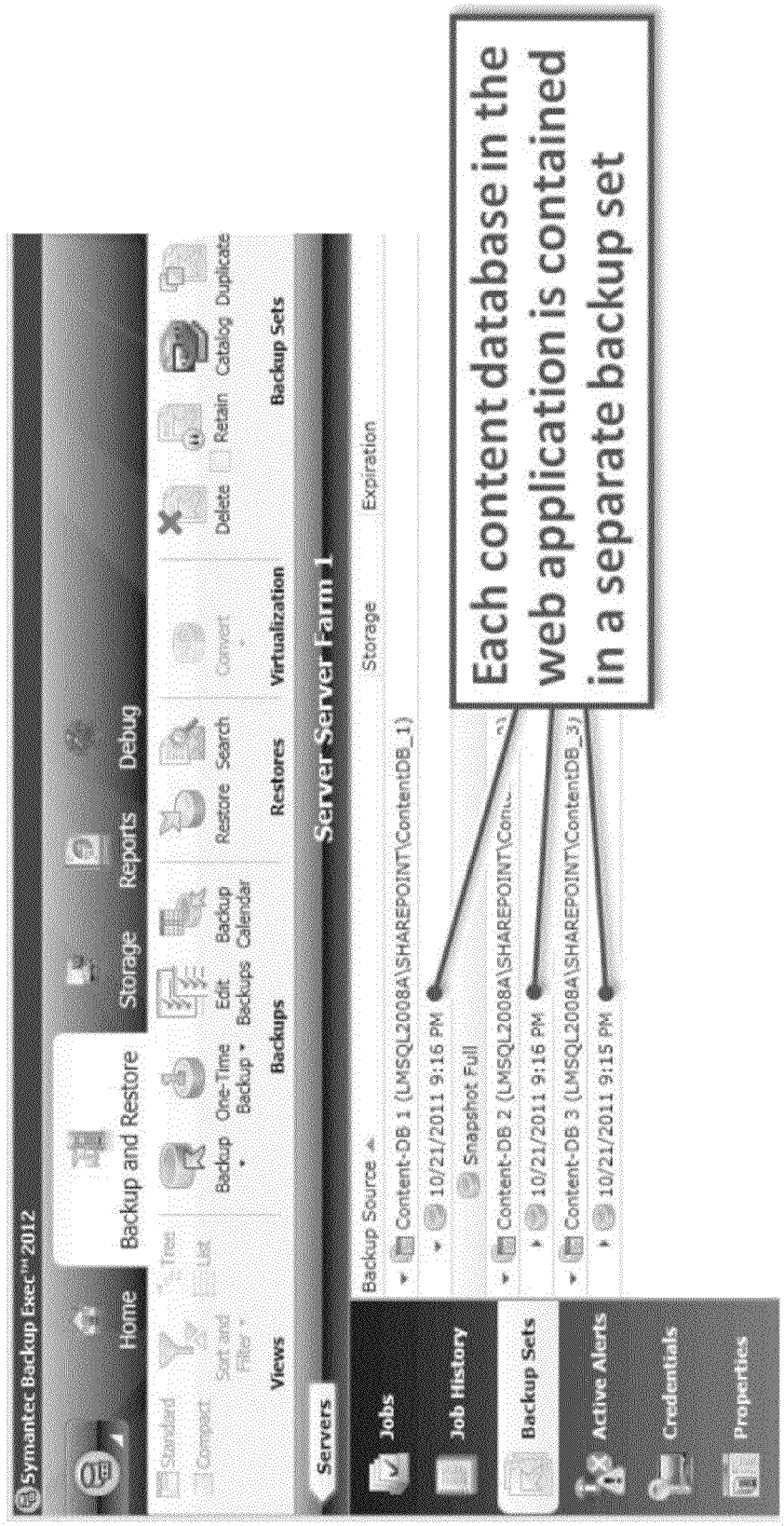
FIGS. 16-18 illustrate an example in which site collections from three content databases are backed up and restored.
Figure 17:
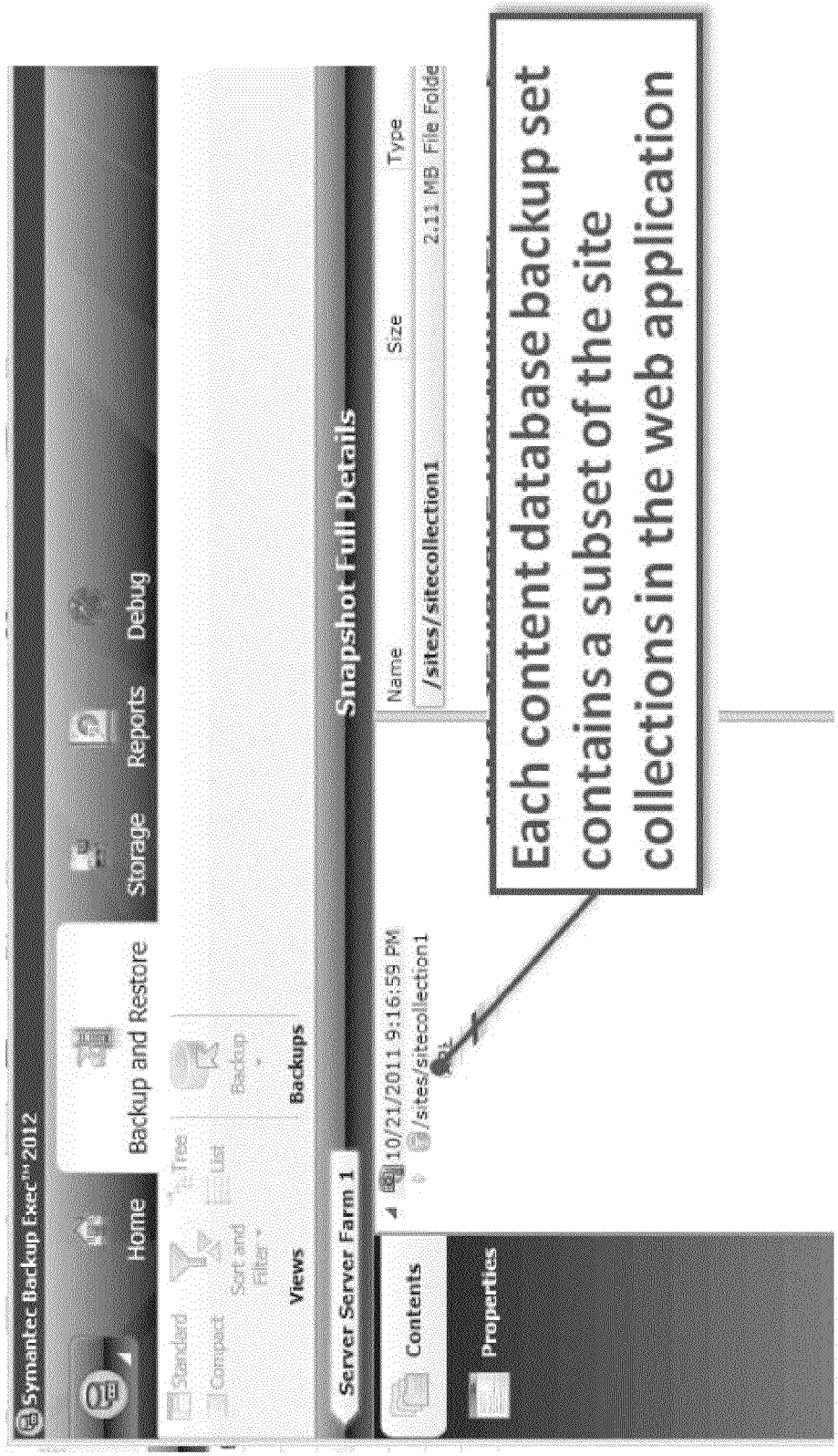
Figure 18:
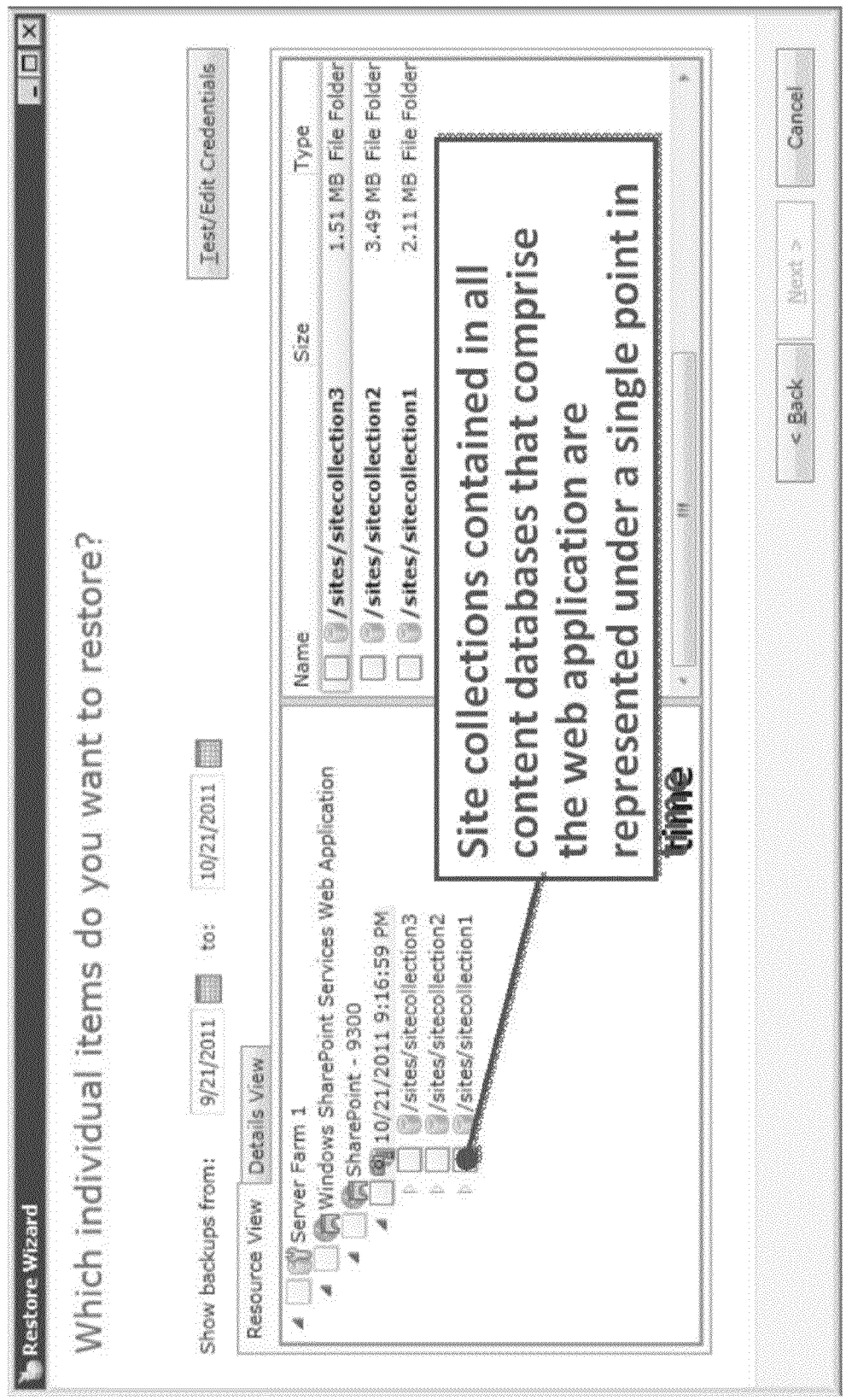

FIGS. 16-18 illustrate an example in which site collections from three content databases are backed up and restored. In this example there are three content databases Content-DB 1, Content-DB 2, and Content-DB 3. As shown in FIG. 16, a single backup job is configured to backup each of the content databases. In this example, each content database has been backed up once by the backup job.

FIG. 17 shows the contents of the content database Content-DB 1, which only stores a single site collection, sitecollection 1. Each of the other two content databases also store a single site collection, where sitecollection2 is stored in the content database Content-DB 2, and sitecollection3 is stored in the content database Content-DB 3.

FIG. 18 illustrates the restoration GUI according to one embodiment. In this example, the backup and restore software 44 has determined that there is one available recovery time upon which to base a restoration of the site collections. The available recovery time is shown in the left-hand side of the GUI (10/21/2011 9:16:59 PM). The complete set of site collections from all three content databases is shown in association with this single recovery time. A selection checkbox is displayed proximally to each individual site collection so that the user can select which site collections to restore. In other embodiments GUI elements other than checkboxes may be used to receive the user input selecting each site collection.

Thus, although the site collections are stored in three separate content databases, they are all aggregated and shown together in the GUI in association with the single recovery time. This may enable a user to easily see all the site collections that were present in all of the content databases of the web application at the recovery time. Moreover, since the complete set of site collections is displayed in association with a single recovery time, the user may be able to easily and efficiently select the complete set of site collections (or the desired ones) for restoration without having to navigate to or click on different recovery times. The user also does not need to know which content databases are in the web application, and does not have to navigate to or inspect the contents of the individual content databases in order to be able to restore the complete set of site collections.

When a new site collection is added to the web application, the web application development platform may in some embodiments choose one of the existing content databases automatically and create the new site collection in that content database. In some cases the user may have little or no control over which content database the new site collection is created in. When it becomes necessary to restore a particular site collection to the web application, it may help the user to display the unified set of all of the site collections that are stored in all of the content databases of the web application. In this way the user can more easily find the particular site collection that contains the content needed to be restored, without requiring the user to have prior knowledge of which content database the site collection of interest is stored in. In a less efficient restoration GUI the user may have to determine which content databases are used in the web application and then separately examine their contents to find the one that has the site collection he wants.

Figure 19:
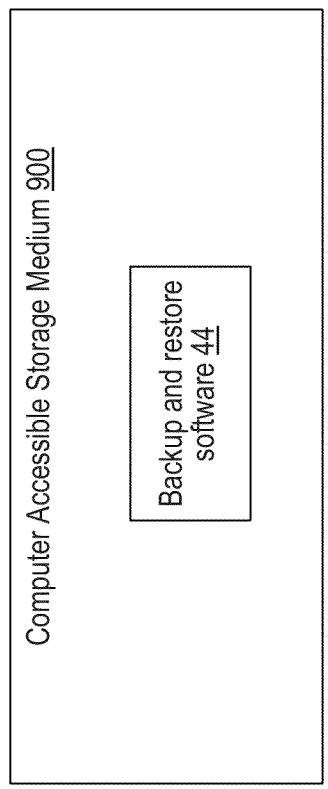
FIG. 19 is a block diagram of a computer accessible storage medium.

Turning now to FIG. 19, a block diagram of a computer accessible storage mediums 900 is shown. The computer accessible storage medium 900 may store program instructions of the backup and restore software 44. The program instructions stored on the computer accessible storage medium 900 may be executable by one or more processors to implement various functions described above. Generally speaking, various embodiments of a computer accessible storage medium are contemplated for storing any set of instructions which, when executed, implement a portion or all of the functions described above.

A computer accessible storage medium may include any storage media accessible by one or more computers during use to provide instructions and/or data to the computer(s). For example, a computer accessible storage medium may include storage media such as magnetic or optical media, e.g., one or more disks (fixed or removable), tapes, CD-ROMs, DVD-ROMs, CD-Rs, CD-RWs, DVD-Rs, DVD-RWs, or Blu-Ray disks. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A computer-accessible storage medium storing program instructions executable by one or more processors to perform operations including:
    displaying on a display device a graphical user interface for restoring information to a web application, wherein displaying the graphical user interface includes:
        determining a plurality of databases used for the web application;
        for each respective database of the plurality of databases, determining one or more site collections stored in the database, wherein each site collection includes a set of data resources for the web application; and
        displaying an aggregated view of the site collections stored in each database of the plurality of databases, wherein the aggregated view enables each site collection to be selected for restoration.

2. The computer-accessible storage medium of claim 1, wherein displaying the graphical user interface further includes:
    determining a recovery time corresponding to the site collections stored in each database of the plurality of databases;
    wherein displaying the graphical user interface includes displaying the aggregated view of the site collections in association with the recovery time.

3. The computer-accessible storage medium of claim 2, wherein the plurality of databases was backed up by a backup job, wherein determining the recovery time corresponding to the site collections comprises determining a time of the backup job.

4. The computer-accessible storage medium of claim 1, displaying the aggregated view of the site collections comprises displaying a selection GUI element proximal to each of the site collections, wherein the selection GUI element for each respective site collection is configured to receive user input selecting the respective site collection for restoration.

5. The computer-accessible storage medium of claim 1, wherein the program instructions are further executable by the one or more processors to perform operations including:
    backing up the plurality of databases prior to displaying the graphical user interface, wherein backing up the plurality of databases includes storing topology information specifying that each database of the plurality of databases is included in the web application and specifying which site collections are in each database;
    wherein said determining the plurality of databases used for the web application and said determining the one or more site collections stored in each database comprise accessing the topology information.

6. The computer-accessible storage medium of claim 1, wherein the aggregated view displays a name of each site collection stored in each database of the plurality of databases.

7. The computer-accessible storage medium of claim 1, wherein at least one database of the plurality of databases is a SharePoint® content database.

8. The computer-accessible storage medium of claim 1, wherein the program instructions are further executable by one or more processors to perform operations including:
   receiving user input selecting one or more of the site collections for restoration; and
   restoring the selected site collections.

9. A method comprising:
   displaying on a display device a graphical user interface for restoring information to a web application, wherein displaying the graphical user interface includes:
      determining a plurality of databases used for the web application;
      for each respective database of the plurality of databases, determining one or more site collections stored in the database, wherein each site collection includes a set of data resources for the web application; and
      displaying an aggregated view of the site collections stored in each database of the plurality of databases, wherein the aggregated view enables each site collection to be selected for restoration.

10. The method of claim 9, wherein displaying the graphical user interface further includes:
    determining a recovery time corresponding to the site collections stored in each database of the plurality of databases;
    wherein displaying the graphical user interface includes displaying the aggregated view of the site collections in association with the recovery time.

11. The method of claim 10, wherein the plurality of databases was backed up by a backup job, wherein determining the recovery time corresponding to the site collections comprises determining a time of the backup job.

12. The method of claim 10, wherein displaying the aggregated view of the site collections comprises displaying a selection GUI element proximal to each of the site collections, wherein the selection GUI element for each respective site collection is configured to receive user input selecting the respective site collection for restoration.

13. The method of claim 10, further comprising:
    backing up the plurality of databases prior to displaying the graphical user interface, wherein backing up the plurality of databases includes storing topology information specifying that each database of the plurality of databases is included in the web application and specifying which site collections are in each database;
    wherein said determining the plurality of databases used for the web application and said determining the one or more site collections stored in each database comprise accessing the topology information.

14. The method of claim 10, further comprising:
    receiving user input selecting one or more of the site collections for restoration; and
    restoring the selected site collections.

15. A system comprising:
    one or more processors; and
    memory storing program instructions executable by the one or more processors to perform operations including:
    displaying on a display device a graphical user interface for restoring information to a web application, wherein displaying the graphical user interface includes:
       determining a plurality of databases used for the web application;
       for each respective database of the plurality of databases, determining one or more site collections stored in the database, wherein each site collection includes a set of data resources for the web application; and
       displaying an aggregated view of the site collections stored in each database of the plurality of databases, wherein the aggregated view enables each site collection to be selected for restoration.

16. The system of claim 15, wherein displaying the graphical user interface further includes:
    determining a recovery time corresponding to the site collections stored in each database of the plurality of databases;
    wherein displaying the graphical user interface includes displaying the aggregated view of the site collections in association with the recovery time.

17. The system of claim 15, wherein the plurality of databases was backed up by a backup job, wherein determining the recovery time corresponding to the site collections comprises determining a time of the backup job.

18. The system of claim 15, wherein the program instructions are further executable by one or more processors to perform operations including:
    receiving user input selecting one or more of the site collections for restoration; and
    restoring the selected site collections.

* * * * *